US011690355B2

(12) United States Patent
Mowlds et al.

(10) Patent No.: US 11,690,355 B2
(45) Date of Patent: Jul. 4, 2023

(54) ANIMAL CONTAINMENT SYSTEMS

(71) Applicants: Bret Jared Mowlds, Troutdale, OR (US); Brian Derek Mowlds, Boring, OR (US)

(72) Inventors: Bret Jared Mowlds, Troutdale, OR (US); Brian Derek Mowlds, Boring, OR (US)

( * ) Notice: Subject to any disclaimer, the term of this patent is extended or adjusted under 35 U.S.C. 154(b) by 0 days.

(21) Appl. No.: 17/396,875

(22) Filed: Aug. 9, 2021

(65) Prior Publication Data

US 2022/0039349 A1 Feb. 10, 2022

Related U.S. Application Data

(60) Provisional application No. 63/063,081, filed on Aug. 7, 2020.

(51) Int. Cl.
*A01K 3/00* (2006.01)
*A01K 27/00* (2006.01)

(52) U.S. Cl.
CPC .............. *A01K 3/00* (2013.01); *A01K 27/003* (2013.01)

(58) Field of Classification Search
CPC ........ A01K 27/00; A01K 3/00; A01K 15/025; A01K 1/04; A01K 15/02; A01K 1/06; A01K 15/027
USPC .......................................................... 119/785
See application file for complete search history.

(56) References Cited

U.S. PATENT DOCUMENTS

| 1,047,330 | A | | 12/1912 | Sundh | |
|---|---|---|---|---|---|
| 1,086,492 | A | | 2/1914 | Weaver | |
| 1,563,212 | A | * | 11/1925 | Madiar | A01K 1/04 119/784 |
| 3,096,741 | A | * | 7/1963 | Ollstein | A01K 27/001 119/792 |
| 4,034,828 | A | * | 7/1977 | Rose | A62B 1/14 182/5 |
| 5,212,982 | A | | 5/1993 | Macchiarulo et al. | |
| 5,979,599 | A | * | 11/1999 | Noles | A62B 35/0087 182/36 |
| 7,040,255 | B1 | * | 5/2006 | Anderson | A01K 1/04 119/784 |
| 10,653,115 | B2 | * | 5/2020 | Mowlds | A63F 9/0601 |
| 2004/0026177 | A1 | | 2/2004 | Ayano et al. | |

(Continued)

FOREIGN PATENT DOCUMENTS

| CN | 107074250 A | 4/2019 |
|---|---|---|
| EP | 1886957 A | 2/2008 |
| FR | 2773758 B1 | 3/2000 |

*Primary Examiner* — Brady W Frazier
*Assistant Examiner* — Zoe Tam Tran
(74) *Attorney, Agent, or Firm* — Miller IP Law

(57) ABSTRACT

Described herein are examples of an animal containment system that includes a cable having a first end connectable with a first vertical structure and a second end connectable with a second vertical structure. A first tensioner attached to the first end of the cable and a second tensioner attached with the second end of the cable. The tensioners are configured to tension the cable between the vertical structures. A slider system configured to translate along the cable, the slider system includes a housing having a front wall, a back wall and a top wall. A first pulley, a second pulley and a third pulley. The first pulley and the second pulley are disposed in an upper portion of the housing. The third pulley may be disposed below the first pulley and the second pulley.

20 Claims, 3 Drawing Sheets

(56) References Cited

U.S. PATENT DOCUMENTS

| | | | |
|---|---|---|---|
| 2004/0200436 A1* | 10/2004 | Staack | A01K 27/005 |
| | | | 119/792 |
| 2004/0244723 A1* | 12/2004 | Wiggins | A01K 27/003 |
| | | | 119/795 |
| 2006/0180402 A1 | 8/2006 | Silberhorn et al. | |
| 2006/0266299 A1* | 11/2006 | DiAntonio | A01K 15/025 |
| | | | 119/708 |
| 2014/0060967 A1* | 3/2014 | Patton | A62B 35/0068 |
| | | | 182/3 |
| 2015/0096502 A1* | 4/2015 | Weston | A01K 1/04 |
| | | | 119/785 |
| 2016/0135430 A1* | 5/2016 | Noonan | A01K 27/003 |
| | | | 119/797 |
| 2016/0199678 A1* | 7/2016 | Tsai | C08G 18/10 |
| | | | 248/636 |
| 2019/0166792 A1* | 6/2019 | MacVicar | A01K 1/04 |
| 2020/0001821 A1* | 1/2020 | Wallace | B60R 22/185 |

* cited by examiner

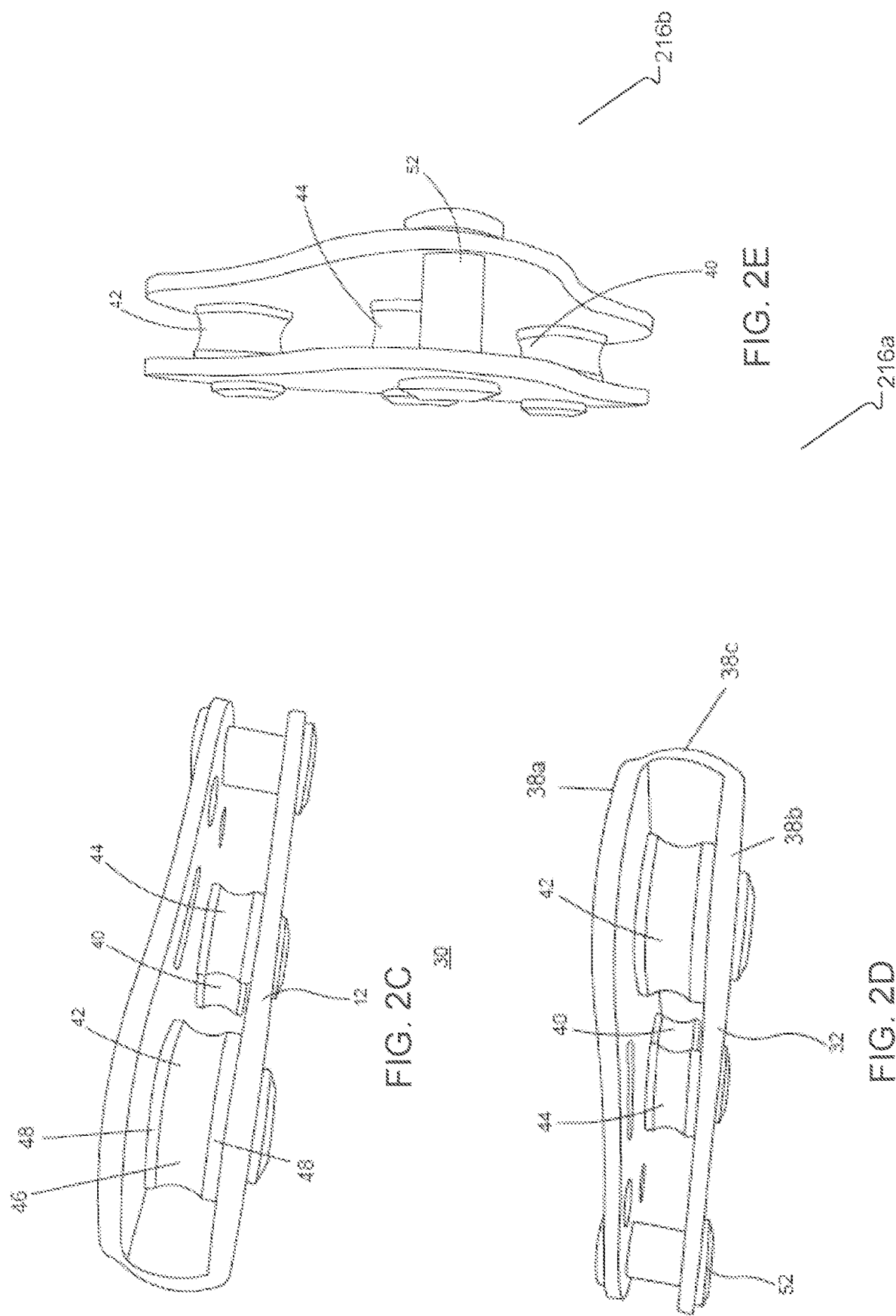

ANIMAL CONTAINMENT SYSTEMS

CROSS-REFERENCE TO RELATED APPLICATIONS

The present application may be a continuation of U.S. Provisional Patent Application No. 63/063,081 entitled "A Triple Roller Pulley with Tow inline Rollers on Top and One Centered on the Bottom", filed on Aug. 7, 2020. The entire contents of the above-listed application are hereby incorporated by reference for all purposes.

BACKGROUND

Most dogs love the freedom of an open yard, with room to frolic and play. However, the thought of your dog taking off and running around the neighborhood if you don't have a fenced-in yard may keep you from allowing your dog that freedom. There are various options to contain a dog, for example, fences lead lines or electric fences.

BRIEF DESCRIPTION OF THE DRAWINGS

The present description will be understood more fully when viewed in conjunction with the accompanying drawings of various examples of animal containment systems. The description may be not meant to limit the animal containment system to the specific examples. Rather, the specific examples depicted and described are provided for explanation and understanding of animal containment systems. Throughout the description, the drawings may be referred to as drawings, figures, and/or FIGs.

FIG. 2C illustrates an opposite side view of the orientation of the pullies of the slider system, according to one embodiment.

FIG. 2D illustrates an attachment mechanism of the slider system for connection to a lead line of the animal containment system, according to one embodiment.

FIG. 2E illustrates the housing and pulley connections to the housing of the slider system, according to one embodiment.

DETAILED DESCRIPTION

Figure 1:
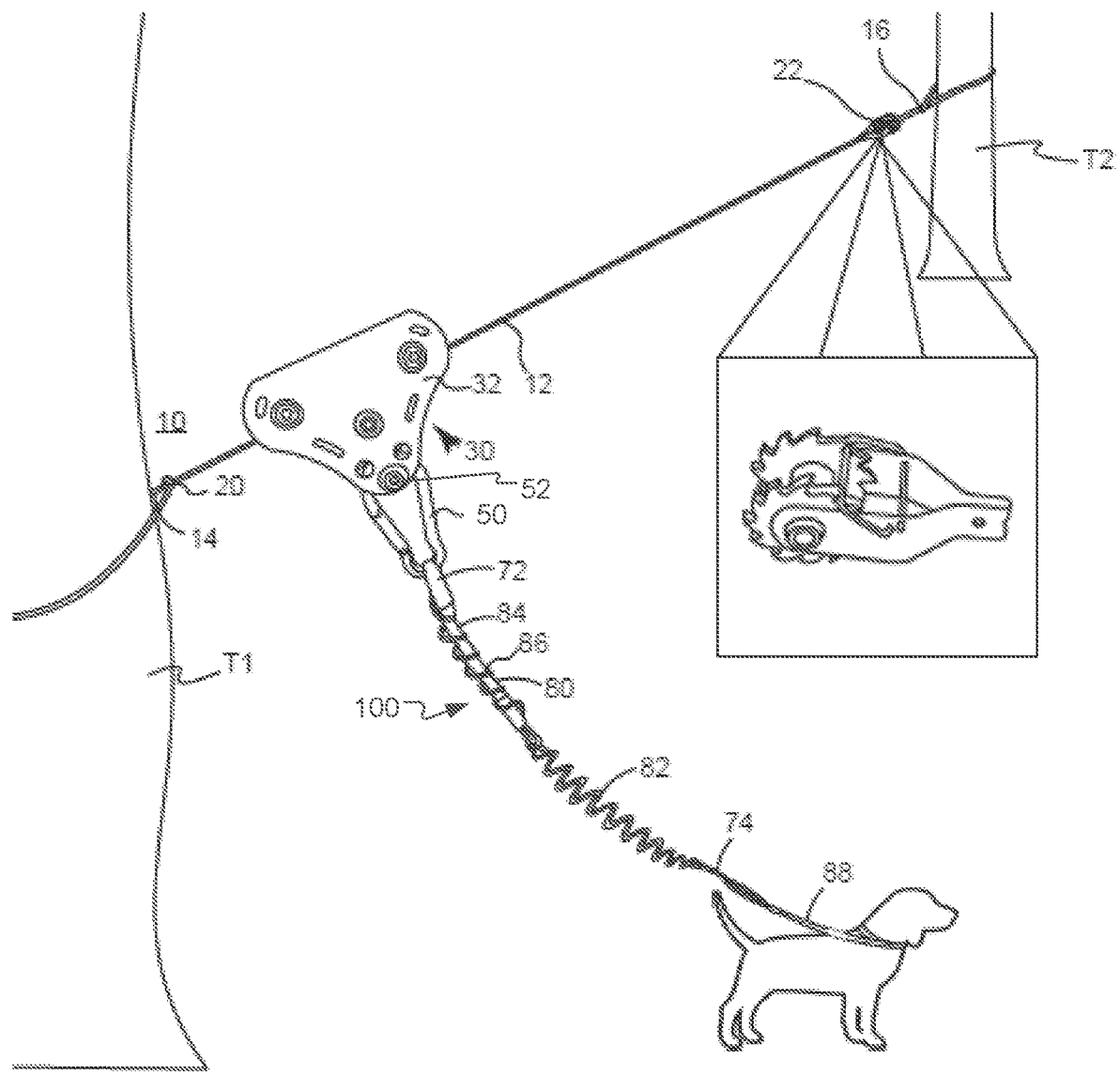
FIG. 1 illustrates an animal containment system, including an enlarged view of a tensioner according to an embodiment.

Animal containment systems as disclosed herein will become better understood through a review of the following detailed description in conjunction with the figures. The detailed description and figures provide merely examples of the various embodiments of animal containment systems. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

For animals, such as dogs, that may live outside or be periodically let outside, a containment system may be needed by the animal's owner to keep the animal within the perimeter of the animal owner's property. Conventionally, animals may be contained through the construction of a fenced enclosure that may be high enough to prevent the animal from escaping the enclosure by going over the fence. Since some animal owners consider above-ground fencing to be unattractive or otherwise undesirable, invisible fences with wire buried underground that defines a desired border for the animals may be used. The wire transmits a signal that activates a specially designed collar worn by the animal when the animal comes within a certain proximity of the border. Physical fences and buried wire systems are labor-intensive to install. Additionally, physical fences may wear out and need fixing and replacing while the wire of invisible fences may be unintentionally cut, or otherwise damaged, such as by digging or tilling during lawn maintenance or the like, such buried wire fence systems are also labor-intensive when attempting to find the location of the broken wire or other difficulties.

Alternative to fences (physical or invisible), animal owners may use so-called animal or dog runs. Conventional dog runs include a horizontal run line (cable, rope, or wire) strung at some distance above the ground and anchored between two supporting objects (trees, posts, etc.). A leash line has one end fastened to the run line for sliding movement thereon. The other end of the leash line may be attached to the dog's collar. The dog run allows the dog to move in an area limited by the length of the run line and the leash line. However, conventional dog runs dogs tend to disengage from the horizontal cable during the movement of the dog back and forth. Constant or aggressive movement of the dog can result in the cable bouncing or slipping off the wheel or pulley of the sliding element. Conventional dog runs may include a slider with a single roller or multiple rollers disposed along a top side of the cable. This structure may be not configured to adequately retain the cable during constant motion or jumping of the dog.

Implementations of animal containment systems may address some or all of the problems described above. An animal containment system may include a cable connected between vertical structures, a slider system, and a leash system for an animal. The slider system may be attached to the cable and the leash system. The slider system may move along the cable as an animal attached to the leash system moves back and forth.

FIG. 1 illustrates an animal containment system 10, including an enlarged view of a tensioner according to an embodiment. Animal containment system 10 includes a horizontal element, for example, a cable 12. Cable 12 extends between an end 14 and an end 16. End 14 may be connectable with a first vertical structure, for example, a tree T1 and end 16 may be connectable with a second vertical structure, for example, a tree T2. The cable 12 may be attached at a threshold height to allow the cable to be attached to the first vertical structure and the second vertical structure and allow translation of a slider system 30. In some embodiments, cable 12 includes a steel material or a lightweight strong synthetic fiber, for example, Kevlar®. Cable 12 can extend various lengths to facilitate altering the length of the animal containment area. In some embodiments, cable 12 may include lengths, for example, 100, 150, and 200-foot lengths. In some embodiments, a travel-sized animal containment system can include a cable 12 length of 75 feet.

System 10 includes at least one tensioner 20. Tensioner 20 may be configured to facilitate the attachment of cable 12 to tree T1. A second tensioner 22 may be configured to facilitate the attachment of cable 12 to tree T2. Tensioners 20, 22 allow cable 12 to be adjustable to various sizes by allowing cable 12 to be pulled through and tensioning at any length along cable 12. attached to an end of the cable to tension the cable between the vertical structures.

The animal containment system 10 may further include a slider system 30. The slider system 30 may be configured to translate along cable 12 to allow the animal to move back and forth. The slider system 30 may include a housing 32. In one embodiment, housing 32 may have a triangular configuration. In another embodiment, the housing 32 may have a rectangular configuration, a circular configuration, and so forth.

Housing 32 may include an attachment mechanism 50. In one example, the attachment mechanism 50 may be a carabiner. Attachment mechanism 50 may be attached with housing 32 by a threaded axle 52. Attachment mechanism 50 may be connectable with a lead line 70.

Animal containment system 10 includes a lead line 70. Lead line 70 extends between an end 72 and an end 74. End 72 may be configured for connection with slider system 30. End 74 may be configured for connection with the animal and/or a leash. In one example, the leash may be detachable Lead line 70 may include an anti-shock lanyard 80, for example, a Bungee® cord and a coiled cable 82.

In some embodiments, lanyard 80 includes a protective sheath 84 that shields it from the damaging rays of the sun. Lanyard 80 may also include a plastic-coated steel coiled cable 86 configured to fully wraps an entire length of lanyard 80. The additional coil cable 86 provides the strength and reliability of a cable or chain line with the ability to offer a softer cushion for the animal and help prevent harsh impacts.

In some embodiments, cable 82 may be connected with an intermediary leash 88 to allow the user to keep the animal tethered after unhooking from lead line 70 to walk them to the house or to take them on a walk. Coiled cable 82 gradually becomes more difficult to pull as it extends, once extended, lanyard 80 and cable 86 will begin to pull and this naturally slows the animal down before a rough impact and/or pull on their harness.

To set up animal containment system 10, a user may locate two vertical structures, for example, tree T1 and trees T2. End 14 of cable 12 may be wrapped around tree T1 and connected with tensioner 20. In some embodiments, system 10 includes a travel system such that vertical structures, for example, metal stakes, are provided in a kit along with the other elements of system 10. End 16 of cable 12 may be inserted between pullies 40 42 and pulley 44. Cable 12 may be pulled through pulleys 40, 42, 44. Slider system 30 base portion 34 may be orientated above cable 12 and the opposite corner portion 36 may be oriented below cable 12. Sliding system 30 may be translated along cable 12. End 16 of cable 12 may be wrapped around tree T2 and connected with tensioner 22. Tensioners 20, 22 are activated to tighten cable 12 relative to trees T1, T2. Coiled cable 86 may be translated along lanyard 80 to surround lanyard 80. Cable 82 may be connected with lanyard 80. Lanyard 80 may be connected with cable 86. Cable 86 may be connected with leash 88, for example, with carabiners. An end of lanyard 80 may be connected with sliding system 30, as described herein. The animal may be connected with leash 88. The animal can safely run within the limited area of the animal containment system 10. During use, cable 12 remains stationary between the trees slider system 30 translates relative to cable 12 to allow the animal to move back and forth. The movement of the animal back and forth causes lead line 70 to apply a force to slider system 30 causing pullies 40, 42, 44 to rotate relative to cable 12 and slider system 30 to translate along cable 12.

FIGS. 2A-2E illustrate various views and orientations of housing 32 of slider system 30.

Figure 2A:
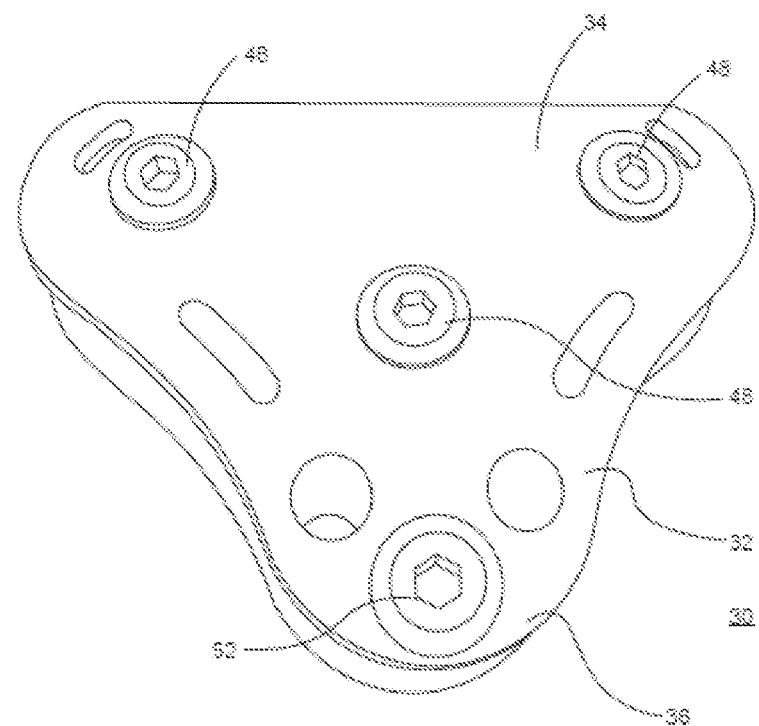
FIG. 2A illustrates a housing of the slider system of the animal containment system, according to one embodiment.
Figure 2B:
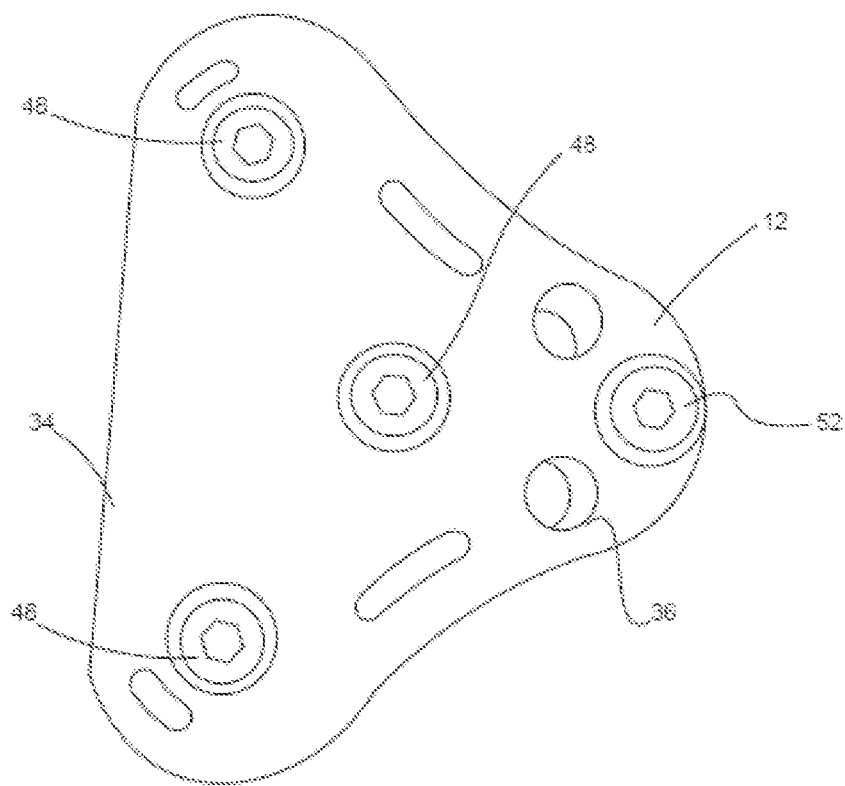
FIG. 2B illustrates the orientation of the pullies of the slider system, according to one embodiment.

FIG. 2A illustrates a housing 32 of slider system 30 of the animal containment system 10, according to one embodiment. FIG. 2B illustrates the orientation of pullies 40, 42, 44 of slider system 30, according to one embodiment. FIG. 2C illustrates an opposite side view of the orientation of pullies 40, 42, 44 of slider system 30, according to one embodiment. FIG. 2D illustrates an attachment mechanism of slider system 30 for connection to a lead line of the animal containment system, according to one embodiment. FIG. 2E illustrates the points of threaded axles 48, 52 of slider system 30, according to one embodiment. Some of the features in FIGS. 2A-2E are the same or similar to some of the features in FIG. 1 and FIGS. 2A-2E as noted by same reference numbers, unless expressly described otherwise.

As discussed therein, slider system 30 may be configured to translate along cable 12 to allow the animal to move back and forth. Housing 32 includes a triangular configuration having a base portion 34 and an opposite corner portion 36. Housing 32 can include various materials, for example, aluminum, galvanized steel, or stainless steel. The material can be varied depending on the size and strength of the animal being attached to the containment system 10.

Housing 32 includes a front wall 38a, a back wall 38b, and a top wall 38c. Walls 38a, 38b, 38c are wrapped around a plurality of pullies 40, 42, 44, as described herein, to allow for cable 12 to be inserted through one side of housing 32 and pulled through an opposite side of the housing 32 for assembly. Siding system 30 includes shows rotating members of slider system 30, for example, a first pulley 40, a second pulley 42, and a third pulley 44.

Pullies 40, 42, 44 can include various materials, for example, aluminum, galvanized steel, or stainless steel. The material can be varied depending on the size and strength of the animal being attached to the containment system 10. Each pulley 40, 42, 44 includes a groove 46 and a flange disposed on each side of groove 46. Grooves 46 are configured for moveable disposal of cable 12. In one example, the grooves 46 may be circumferential. Pullies 40, 42, 44 are oriented to retain cable 12 therebetween to resist and/or prevent disengagement of cable 12. For example, first pulley 40 and second pulley 42 are disposed within base portion 34. Third pulley 44 may be disposed below the first and second pullies. Pullies 40, 42, 44 maintain tight tolerances between pullies 40, 42 and pulley 44 such that cable 12 may be constantly engaged by pullies 40, 42, 44 during moving or bouncing of cable 12. Pullies 40, 42, 44 are oriented with a slight overlap within housing 32 to allow a cable only of a certain size to fit thereby making cable 12 completely secure from falling out of place.

This configuration resists and/or prevents slack occurring in cable 12 or cable 12 becoming bound up along a side of one of the pullies making the pullies difficult to move. Pullies 40, 42, 44 are connected with housing utilizing threaded axles 48 allowing pullies 40, 42, 44 to rotate relative to housing 32.

In some embodiments, system 10 includes one or more stops for positioning along cable 12. In some embodiments, the stops are adjustable to vary a distance of movement of slider system 30 along cable 12. The stop may be configured to prevent movement of slider system 30 when slider system 30 abuts the stop. The stops are configured to adjust the length of travel of the slider system 30 to limit or expand the area the animal can run.

A feature illustrated in one of the figures may be the same as or similar to a feature illustrated in another of the figures.

Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

The foregoing description sets forth numerous specific details such as examples of specific systems, components, methods, and so forth, to provide a good understanding of several implementations. It will be apparent to one skilled in the art, however, that at least some implementations may be practiced without these specific details. In other instances, well-known components or methods are not described in detail or are presented in simple block diagram format to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It may be to be understood that the foregoing description may be intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims may be to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D may be an example that includes A, includes B, includes C, and also includes D. As used herein regarding a list, "or" forms a list of elements, any of which may be included. For example, an example described as including A, B, C, or D may be an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D may be an example that may include: A alone; A and B; A, B and C; A, B, C, and D; and so forth. The bounds of an "and/or" list are defined by the complete set of combinations and permutations for the list.

Where multiples of a particular element are shown in a FIG., and where it may be clear that the element may be duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system, comprising:
a cable having a first end connectable with a first vertical structure and a second end connectable with a second vertical structure;

a tensioner attached to the first end of the cable, the tensioner is configured to tension the cable between the first vertical structure and the second vertical structure;
a slider system configured to translate along the cable, the slider system comprises:
a housing including a front wall, a back wall and a top wall;
a first pulley;
a second pulley; and
a third pulley, wherein:
the first pulley and the second pulley are disposed in an upper portion of the housing;
the third pulley is disposed below the first pulley and the second pulley;
the front wall, the back wall, and the top wall of the housing are oriented to wrap around the first pulley, the second pulley, and the third pulley to allow for the cable to be inserted through one side of the housing and pulled through an opposite side of the housing; and
the cable is oriented below the first pulley and the second pulley and above the third pulley such that the cable is between the first pulley, the second pulley, and the third pulley;
a lead line comprising:
an anti-shock lanyard;
a first coiled cable configured to provide additional strength protection wrapped around the anti-shock lanyard; and
a second coiled cable connected to the anti-shock lanyard configured to connect with the slider system and a collar.

2. The system of claim 1, wherein the cable includes at an adjustable stop configured for connection with the cable and to prevent movement of the slider system when the slider system abuts the adjustable stop, wherein the adjustable stop is configured to vary a distance of movement of the slider system along the cable.

3. The system of claim 1, wherein the first vertical structure and the second vertical structure are stakes having a threshold height to allow the cable to be attached to the stakes and allow translation of the slider system.

4. The system of claim 1, wherein the lead line includes a detachable leash portion configured to be held to maintain control of an animal when disconnecting the collar from the lead line.

5. The system of claim 1, wherein the housing includes a triangular configuration having a base portion and an opposite corner portion.

6. The system of claim 5, wherein when the slider system is engaged with the cable, the base portion is orientated above the cable and the opposite corner portion is oriented below the cable.

7. The system of claim 6, wherein the opposite corner portion includes an attachment mechanism configured for connection to the lead line.

8. The system of claim 1, wherein the first pulley, the second pulley, or the third pulley includes include a circumferential groove and a flange disposed on either side of the circumferential groove, the flanges are configured to capture the cable to resist disengagement of the cable.

9. The system of claim 1, wherein:
the cable remains stationary between the first vertical structure and the second vertical structure; and
the slider system translates relative to the cable to allow an animal to move back and forth.

10. The system of claim 1, wherein the movement of an animal back and forth causes the lead line to apply a force to the slider system causing the first pulley, the second pulley, and the third pulley to rotate relative to the cable and the slider system to translate along the cable.

11. The system of claim 1, wherein the first pulley, the second pulley, and the third pulley are connected with the housing by threaded axles to facilitate rotation of the first pulley, the second pulley, and the third pulley relative to the housing.

12. A system, comprising:
a cable having a first end connectable with a first vertical structure and a second end connectable with a second vertical structure;
a tensioner attached to the first end of the cable, the tensioner is configured to tension the cable between the first vertical structure and the second vertical structure;
a slider system configured to translate along the cable, the slider system comprises:
a housing comprises:
the housing includes a triangular configuration having a base portion, an opposite corner portion;
a first pulley;
a second pulley; and
a third pulley, wherein:
the first pulley and the second pulley are disposed in the base portion of the housing:
the third pulley is disposed below the first pulley and the second pulley and above the opposite corner portion, the first pulley, the second pulley, or the third pulley include a circumferential groove and a flange disposed on either side of the circumferential groove; and
the cable is oriented below the first pulley and the second pulley and above the third pulley such that the cable is between the first pulley, the second pulley, and the third pulley and the flanges are configured to capture the cable to resist disengagement of the cable;
a lead line comprising:
an anti-shock lanyard; and
a coiled cable configured to wrap around the anti-shock lanyard to provide additional strength and reliability wherein the lead line is configured to connect with the slider system and a collar.

13. The system of claim 12, wherein the housing includes a front wall, a back wall and a top wall, the walls are wrapped around the first pulley, the second pulley, and the third pulley to allow for the cable to be inserted through one side of the housing and pulled through an opposite side of the housing.

14. The system of claim 13, wherein the front wall and back wall are connected at a corner by an attachment mechanism.

15. The system of claim 12, wherein when the slider system is engaged with the cable, the base portion is orientated above the cable and the corner portion is oriented below the cable.

16. The system of claim 12, wherein the first pulley, the second pulley, and the third pulley are engaged with the housing by threaded axles to facilitate rotation of the first pulley, the second pulley, and the third pulley relative to the housing.

17. The system of claim 12, wherein:
the cable remains stationary between the first vertical structure and the second vertical structure: and
the slider system translates relative to the cable to allow an animal to move back and forth.

18. The system of claim 12, wherein the movement of the animal back and forth causes the first pulley, the second pulley, and the third pulley to rotate relative to the cable and the slider system to translate along the cable.

19. The system of claim 12, wherein the first pulley, the second pulley, and the third pulley are connected with the housing by threaded axles to facilitate rotation of the first pulley, the second pulley, and the third pulley relative to the housing.

20. A system comprising:
a horizontal element having an end connectable with a first vertical structure and an end connectable with a second vertical structure;
at least one tensioner attached to an end of the horizontal element to tension the horizontal element between the first vertical structure and the second vertical structure;
a slider system configured to translate along the horizontal element, the slider system comprises:
a housing comprising:
a first rotating member;
a second rotating member; and
a third rotating member, wherein:
the third rotating member is disposed below the first rotating member and the second rotating member and above the opposite corner portion, and an axle connecting the front wall and the back wall disposed below the third rotating member and configured for securing an attachment mechanism to the housing;
wherein the horizontal element is oriented below the first rotating member and the second rotating member and above the third rotating member such that the cable is between the first rotating member, the second rotating member, and the third rotating member; and
a lead line comprising:
an anti-shock lanyard; and
a coiled cable, the lead line is configured for connection with the slider system and a collar of an animal.

\* \* \* \* \*